(12) United States Patent
Koo

(10) Patent No.: US 12,077,150 B2
(45) Date of Patent: Sep. 3, 2024

(54) SYSTEM AND METHOD FOR MHSG FAILURE DIAGNOSIS OF MILD HYBRID VEHICLE

(71) Applicants: Hyundai Motor Company, Seoul (KR); Kia Corporation, Seoul (KR)

(72) Inventor: Bon Chang Koo, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 17/564,948

(22) Filed: Dec. 29, 2021

(65) Prior Publication Data

US 2023/0051949 A1   Feb. 16, 2023

(30) Foreign Application Priority Data

Aug. 10, 2021  (KR) .......................... 10-2021-0104969

(51) Int. Cl.
| | |
|---|---|
| *F02N 11/08* | (2006.01) |
| *B60W 20/50* | (2016.01) |
| *F01N 9/00* | (2006.01) |
| *G07C 5/08* | (2006.01) |

(52) U.S. Cl.
CPC ............... *B60W 20/50* (2013.01); *F01N 9/00* (2013.01); *G07C 5/0808* (2013.01); *G07C 5/085* (2013.01); *B60W 2510/0638* (2013.01); *B60W 2510/0657* (2013.01); *B60W 2510/0676* (2013.01); *B60W 2510/083* (2013.01); *B60W 2510/1005* (2013.01); *F01N 2900/08* (2013.01)

(58) Field of Classification Search
CPC ......... B60W 20/50; B60W 2510/0638; B60W 2510/0657; F01N 9/00; G07C 5/0808; G07C 5/085
See application file for complete search history.

(56) References Cited

U.S. PATENT DOCUMENTS 9,982,647 B2 *  5/2018  Imura ................ F02N 11/0844

* cited by examiner

*Primary Examiner* — Gonzalo Laguarda
(74) *Attorney, Agent, or Firm* — Slater Matsil, LLP

(57) ABSTRACT

An embodiment system for mild hybrid starter and generator (MHSG) failure diagnosis of a mild hybrid vehicle includes a data detection part configured to detect data for determining whether to activate a catalyst, and a controller configured to determine whether there is an MHSG failure using a deviation between a required torque and an actual operating torque of an MHSG after determining whether catalyst activation is needed and whether to start a stage of the MHSG failure diagnosis based on the data detected by the data detection part.

20 Claims, 4 Drawing Sheets

SYSTEM AND METHOD FOR MHSG FAILURE DIAGNOSIS OF MILD HYBRID VEHICLE

CROSS-REFERENCE TO RELATED APPLICATIONS

This application claims the benefit of Korean Patent Application No. 10-2021-0104969, filed on Aug. 10, 2021, which application is hereby incorporated herein by reference.

TECHNICAL FIELD

The present disclosure relates to a system and a method for a mild hybrid starter and generator (MHSG) failure diagnosis of a mild hybrid vehicle.

BACKGROUND

A powertrain of a mild hybrid vehicle, as shown in FIG. 1, includes an engine 10, a mild hybrid starter and generator (MHSG) 20 which is coupled to a crankshaft of an engine and performs a dual function of a starter for starting an engine and a generator for power generation, and a transmission 30 connected to an output shaft of an engine. A mild hybrid vehicle moves as torque that is output from the transmission 30 is transmitted to driving wheels 40.

The MHSG operates using battery power to start an engine, operates using battery power to assist engine power in accelerating, and performs a function of charging a battery 50 (e.g., a 48V battery) through regenerative electric power generation in decelerating.

Meanwhile, when a catalyst in an exhaust gas reduction device is at a low temperature below a predetermined temperature, nitrogen oxides (NOx), carbon monoxide (CO), and particulate matter (PM) may not be filtered as usual, thus catalyst heating is necessary to shorten the time for catalyst activation immediately after an engine start.

To this end, immediately after the engine start, an output torque of the MHSG is controlled to raise the temperature of an engine to be above a predetermined level to assist an engine torque, prompting catalyst heating by engine exhaust heat and thereby the time for catalyst activation may easily be shortened.

The MHSG performing the above functions in a mild hybrid vehicle is a component that requires failure diagnosis depending on various driving conditions in response to the North-America On Board Diagnosis (OBD) regulations.

For example, in response to the North-America OBD regulations, diagnosis of a MHSG failure is required under the condition in which the MHSG operates while assisting an engine torque for catalyst heating to shorten the time for catalyst activation immediately after an engine start.

SUMMARY

The present disclosure relates to a system and a method for a mild hybrid starter and generator (MHSG) failure diagnosis of a mild hybrid vehicle. Particular embodiments relate to a system and a method for MHSG failure diagnosis of a mild hybrid vehicle that enable diagnosis of an MHSG failure when activation of an exhaust gas purification catalyst is in progress after an engine start.

Accordingly, the present disclosure has been made keeping in mind problems occurring in the related art, and embodiments of the present disclosure provide a system and a method for MHSG failure diagnosis of a mild hybrid vehicle that enable diagnosis of an MHSG failure without adding an extra sensor when the MHSG operates while assisting an engine torque for catalyst heating to shorten the time for catalyst activation of an exhaust gas purifier immediately after an engine start.

One embodiment of the present disclosure provides a system for MHSG failure diagnosis of a mild hybrid vehicle, the system including a data detection part configured to detect data for determining whether to activate a catalyst, and a controller configured to determine whether there is an MHSG failure using deviation between a required torque and an actual operating torque of the MHSG after determining whether a catalyst activation is needed and whether to start a stage of MHSG failure diagnosis on the basis of data detected from the data detection part.

The data detection part may include a crank position sensor for detecting an engine RPM and a water temperature sensor for detecting engine coolant temperature.

The controller may include a catalyst activation determination part for determining whether a catalyst activation is needed on the basis of data detected from the data detection part, a failure diagnosis start determination part for determining whether to start the stage of MHSG failure diagnosis when a catalyst activation is needed, and a failure judgment part for determining whether there is an MHSG failure using deviation between a required torque and an actual operating torque of the MHSG.

The catalyst activation determination part of the controller may be configured to determine that a catalyst activation is needed when it is confirmed that the engine RPM is equal to or higher than an idle RPM upon reading a signal from the crank position sensor and when measured water temperature is between an upper limit and a lower limit which is for determining catalyst activation upon reading a signal from the water temperature sensor.

The failure diagnosis start determination part of the controller may be configured to determine whether an MHSG required torque is equal to or higher than a minimum torque for MHSG failure diagnosis after the catalyst activation determination part determines catalyst activation is needed, and to determine a start of an MHSG failure diagnosis when the MHSG required torque is equal to or higher than a minimum torque for the MHSG failure diagnosis.

The failure diagnosis start determination part of the controller may be configured to determine a start of the MHSG failure diagnosis only when a controller area network (CAN) communication state between an engine controller and an MHSG controller is in a normal state.

The failure judgment part of the controller may be configured to determine that the MHSG is out of order when the actual operating torque of the MHSG deviates from preset limits of a maximum required torque and a minimum required torque of the MHSG for each engine RPM.

In an exemplary embodiment, the failure judgment part of the controller may be configured to determine the MHSG is out of order when a value calculated by subtracting the maximum required torque for each engine RPM from the actual operating torque of the MHSG exceeds a first threshold for a predetermined period of time or more.

In another exemplary embodiment, the failure judgment part of the controller may be configured to determine that the MHSG is out of order when a value calculated by subtracting the actual operating torque of the MHSG from the minimum required torque for each engine RPM exceeds a second threshold for a predetermined period of time or more.

The system for MHSG failure diagnosis may further include a failure code memory for storing an MHSG failure code output from the failure judgment part of the controller, and a failure notification part for notifying a failure of the MHSG.

An embodiment of the present disclosure provides a method for MHSG failure diagnosis of a mild hybrid vehicle, the method including determining whether a catalyst activation of an exhaust gas purifier is needed after an engine start of a mild hybrid vehicle, determining whether to start the MHSG failure diagnosis when the MHSG is operated to assist engine torque for the catalyst activation, and determining whether there is an MHSG failure using deviation between a required torque and an actual operating torque of the MHSG.

In the determining whether catalyst activation is needed, a need for catalyst activation may be determined when it is confirmed that the engine RPM is equal to or higher than the idle RPM and the measured water temperature is between an upper limit and a lower limit for determining catalyst activation.

In the determining whether to start the MHSG failure diagnosis, a start of the MHSG failure diagnosis may be determined when a required torque of the MHSG for catalyst activation exceeds a minimum torque for the MHSG failure diagnosis.

In the determining whether there is an MHSG failure, it may be determined that the MHSG is out of order when an actual operating torque of the MHSG obtained from multiplying a gear ratio by operating power and then dividing the multiplying result by the RPM of the MHSG deviates from preset limits of a maximum required torque and a minimum required torque of the MHSG for each engine RPM.

In an exemplary embodiment, in the determining whether there is an MHSG failure, it may be determined that the MHSG is out of order when a value calculated by subtracting a maximum required torque of the MHSG for each engine RPM from the actual operating torque of the MHSG exceeds the first threshold and when it is confirmed that the exceeding time is maintained for a predetermined period of time or more.

In another exemplary embodiment, in the determining whether there is an MHSG failure, it may be determined that the MHSG is out of order when a value calculated by subtracting an actual operating torque of the MHSG from a minimum required torque of the MHSG for each engine RPM exceeds the second threshold and when it is confirmed that the exceeding time is maintained for a predetermined period of time or more.

After the MHSG failure is determined, the method may further include storing an MHSG failure code in a failure code memory and operating a failure notification part by the MHSG failure code.

According to an exemplary embodiment of the present disclosure, an MHSG failure diagnosis can be made easily without adding an extra sensor when an output torque of the MHSG is controlled to assist engine torque for catalyst heating to shorten the time for catalyst activation of an exhaust gas purifier immediately after an engine of a mild hybrid vehicle starts.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Hereinafter, preferred embodiments of the present disclosure will be described in detail with reference to the accompanying drawings.

According to an embodiment of the disclosure, a diagnosis of a mild hybrid starter and generator (MHSG) failure may be made without adding an extra sensor when an output torque of the MHSG is controlled to assist engine torque for catalyst heating to shorten the time for catalyst activation of an exhaust gas purifier immediately after an engine of a mild hybrid vehicle starts.

Figure 1:
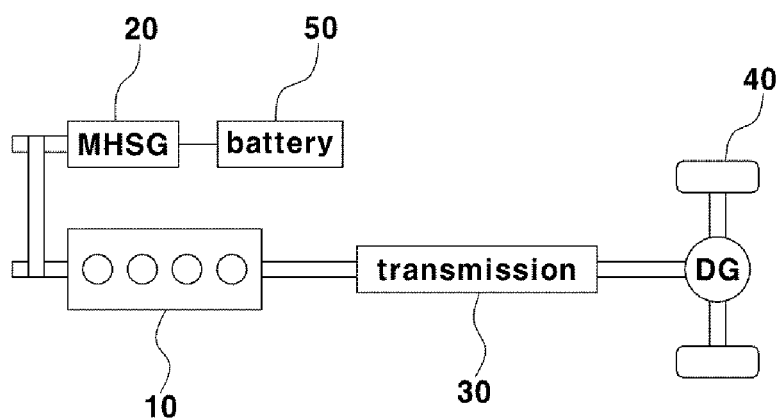
FIG. 1 is a schematic view illustrating a powertrain of a mild hybrid vehicle.
Figure 2:
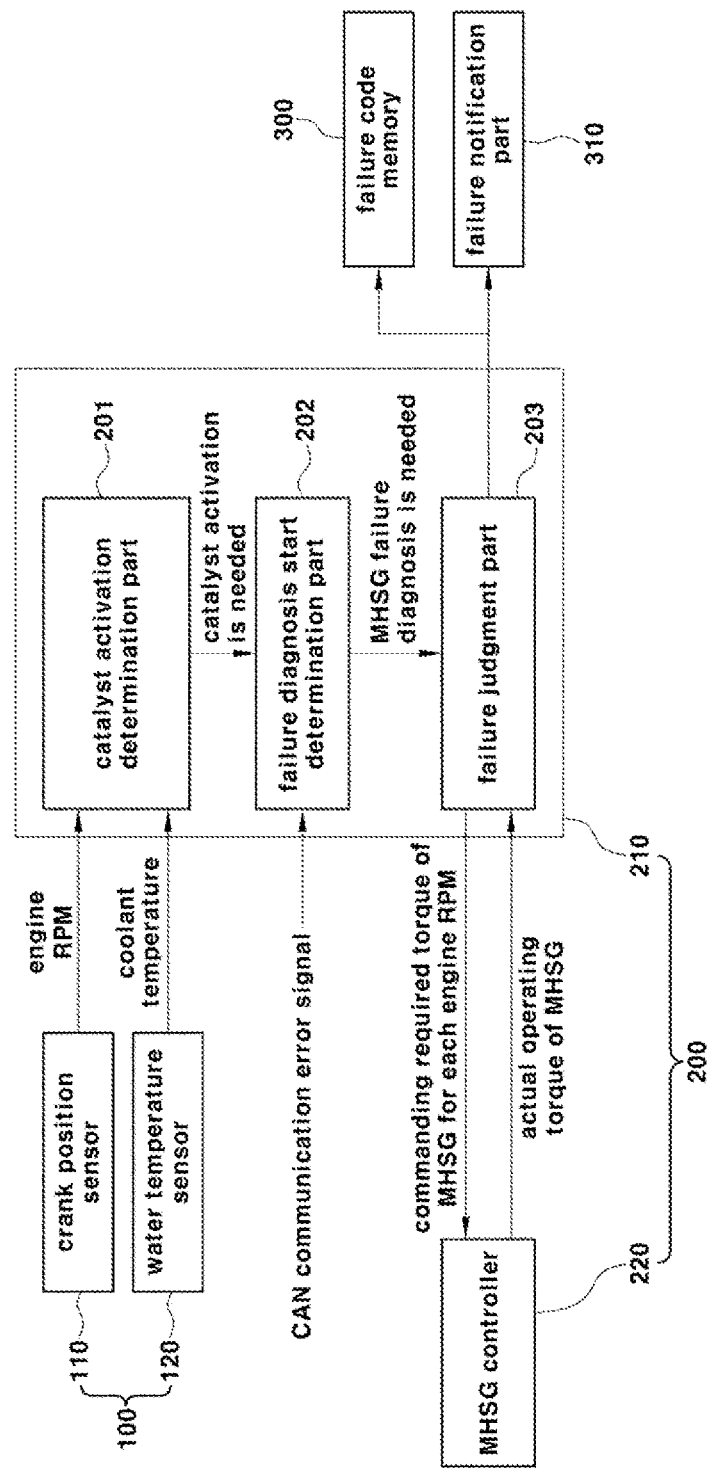
FIG. 2 is a diagram illustrating a system for a mild hybrid starter and generator (MHSG) failure diagnosis of a mild hybrid vehicle according to an exemplary embodiment of the present disclosure.

The accompanying FIG. 2 is a diagram illustrating a system for MHSG failure diagnosis of a mild hybrid vehicle according to an exemplary embodiment of the present disclosure.

As shown in the accompanying FIG. 2, the system for MHSG failure diagnosis includes a data detection part 100 configured to detect data for determining whether to activate a catalyst and a controller 200 configured to determine whether there is an MHSG failure using deviation between a required torque and an actual operating torque of the MHSG after determining whether a catalyst activation is needed and whether to start the stage of the MHSG failure diagnosis on the basis of data detected from the data detection part 100.

The data detection part boo may include a crank position sensor 110 for detecting an engine RPM and a water temperature sensor 120 for detecting engine coolant temperature.

The controller 200 may include a catalyst activation determination part 201 configured to determine whether a catalyst activation is needed on the basis of data detected from the data detection part 100, a failure diagnosis start determination part 202 configured to determine whether to start the stage of the MHSG failure diagnosis when a catalyst activation is needed, and a failure judgment part 203 for determining whether there is an MHSG failure using deviation between a required torque and an actual operating torque of the MHSG.

The controller 200 may be configured to have an engine control unit (ECU) 210 including the catalyst activation determination part 201, the failure diagnosis start determination part 202, and the failure judgment part 203 and an MHSG controller 220 which provides information about an actual operating torque of the MHSG to the ECU 210, or the controller 200 may be configured as one integrated controller.

The catalyst activation determination part 201 of the controller 200 is configured to determine that a catalyst activation is needed when it is confirmed that the engine RPM is equal to or higher than the idle RPM upon reading a signal from the crank position sensor no and when measured water temperature is between an upper limit and a lower limit for determining catalyst activation upon reading a signal from the water temperature sensor 120.

The failure diagnosis start determination part 202 of the controller 200 is configured to determine whether a required torque of the MHSG for a catalyst activation is equal to or higher than a minimum torque for the MHSG failure diagnosis (e.g., 5 Nm) when the catalyst activation determination part 201 determines that a catalyst activation is needed, and when a required torque of the MHSG is equal to or higher than a minimum torque for the MHSG failure diagnosis, the failure diagnosis start determination part 202 determines a start of the MHSG failure diagnosis.

When the controller 200 is configured to have the ECU 210 and the MHSG controller 220, failure diagnosis for the MHSG may be made with ECU 210 and the MHSG controller 220 connected through a controller area network (CAN) communication for exchanging information on torque.

Here, the failure diagnosis start determination part 202 of the controller 200 is configured to determine a start of the MHSG failure diagnosis only when a CAN communication error signal is not received upon checking a CAN communication state, in other words, only when a CAN communication state between an engine control unit and an MHSG controller is in a normal state.

The failure judgment part 203 of the controller 200 is configured to determine whether the MHSG which is operated to assist an engine torque for a catalyst activation is actually out of order, and in doing so, the failure judgment part 203 uses deviation between a required torque and an actual operating torque of the MHSG.

To this end, the failure judgment part 203 of the controller 200 commands a required torque of the MHSG for each engine RPM to the MHSG controller 220 and receives an actual operating torque of the MHSG for each engine RPM from the MHSG controller 220.

Here, the actual operating torque of the MHSG may be controlled with command value of a required torque of the MHSG for each engine RPM by torque control signal from an MHSG controller 220, and the MHSG controller 220 transmits an actual operating torque of the MHSG for each engine RPM to the failure judgment part 203 of the controller 200.

Also, the MHSG controller 220 estimates an actual operating torque of the MHSG by multiplying a gear ratio by operating power and then dividing the multiplying result by the RPM of the MHSG, and transmits the estimated actual operating torque of the MHSG to the failure judgment pall 203 of the controller 200.

Note that the gear ratio refers to a gear ratio of a gearbox connected to an output shaft of a motor since the MHSG is a kind of motor.

The failure judgment part 203 of the controller 200 is configured to determine that the MHSG is out of order when an actual operating torque of the MHSG transmitted from the MHSG controller 220 deviates from preset limits of a maximum required torque and a minimum required torque of the MHSG for each engine RPM.

For example, the failure judgment part 203 of the controller 200 determines that the MHSG is out of order by comparing a value, calculated by subtracting a maximum required torque for each engine RPM from the actual operating torque of the MHSG transmitted from the MHSG controller 220, with the first threshold which is a positive number and then when the value exceeds a first threshold for a predetermined period of time or more.

The failure judgment part 203 of the controller 200 also determines the MHSG is out of order by comparing a value, calculated by subtracting an actual operating torque of the MHSG transmitted from the MHSG controller 220 from a minimum required torque of the MHSG for each engine RPM, with the second threshold which is a positive number and then when the value exceeds a second threshold for a predetermined period of time or more.

As such, when an actual operating torque of the MHSG which operates to assist engine torque for the catalyst activation is high enough to exceed the first threshold when compared to a maximum required torque for each engine RPM, or when an actual operating torque of the MHSG is low enough to exceed the second threshold compared to a minimum required torque for each engine RPM, it may be determined that there is something wrong with an actual operating torque of the MHSG, namely an actual output torque, and it may be determined that MHSG is out of order.

In addition, an MHSG failure code that is output from the failure judgment part 203 of the controller 200 is stored in a failure code memory 300 for later confirmation in case maintenance is needed due to the MHSG failure.

Further, the MHSG failure code, which is output from the failure judgment part 203 of the controller 200, lets a driver recognize the MHSG is out of order by operating a failure notification part 310 including car dashboard warning lights.

Now, a method for MHSG failure diagnosis of a mild hybrid vehicle on the basis of the above configuration will be described sequentially.

Figure 3:
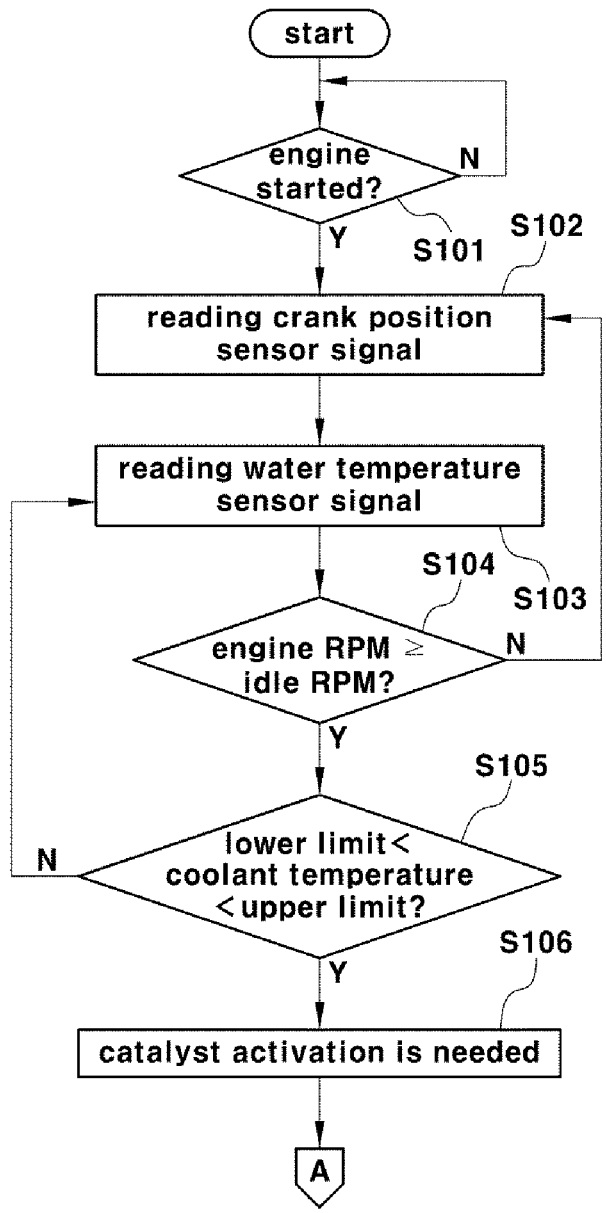
FIGS. 3 and 4 are flowcharts illustrating a method for an MHSG failure diagnosis of a mild hybrid vehicle according to an exemplary embodiment of the present disclosure.
Figure 4:
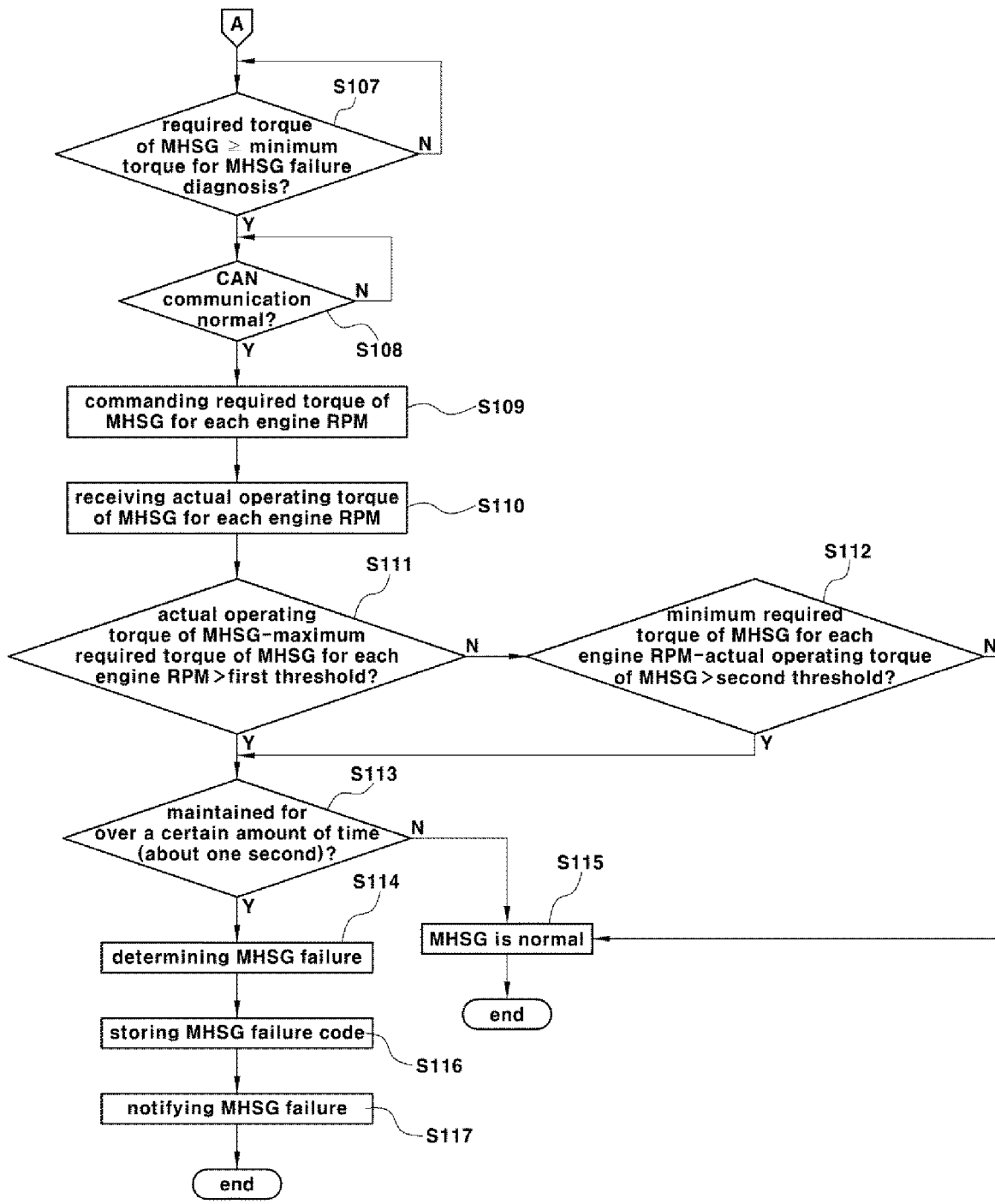

FIGS. 3 and 4 are flowcharts illustrating a method for MHSG failure diagnosis of a mild hybrid vehicle according to an embodiment of the present disclosure.

First, whether a catalyst activation of an exhaust gas purifier after an engine of a mild hybrid vehicle starts is needed will be determined.

To this end, the catalyst activation determination part 201 of the controller 200 checks at S101 whether an engine is started, reads at S102 the signal from the crank position sensor, and reads at S103 the signal from the water temperature sensor.

Then, the catalyst activation determination part 201 of the controller 200 compares at S104 the engine RPM, obtained by reading the signal from the crank position sensor no, to a preset idle RPM, and compares at S105 the engine coolant temperature, obtained by reading the signal from the water temperature sensor 120, to an upper limit (e.g., 60° C.) and a lower limit (e.g., −10° C.) for determining catalyst activation.

When the result confirms that the engine RPM is equal to or higher than the idle RPM upon reading the signal from the crank position sensor no and that the measured water temperature is between an upper limit (e.g., 60° C.) and a lower limit (e.g., −10° C.) for determining catalyst activation upon reading the signal from the water temperature sensor 120, the catalyst activation determination part 201 of the controller 200 determines at S106 that a catalyst activation is needed.

Next, whether to start the MHSG failure diagnosis will be determined when the MHSG operates to assist an engine torque for the catalyst activation.

To this end, the failure diagnosis start determination part 202 of the controller 200 determines at S107 whether a required torque of the MHSG for a catalyst activation is equal to or higher than a minimum torque for the MHSG failure diagnosis (e.g., 5 Nm) when the catalyst activation determination part 201 determines that a catalyst activation is needed, and when a required torque of the MHSG is equal to or higher than a minimum torque for the MHSG failure diagnosis, the failure diagnosis start determination part 202 determines a start of the MHSG failure diagnosis.

For the MHSG failure diagnosis, exchanging information on torque between the engine control unit 210 and the MHSG controller 220 of the controller 200 is needed, and for that reason, it should be determined at S108 whether the engine control unit 210 and the MHSG controller 220 are connected through CAN communication for exchanging information on torque.

Accordingly, the failure diagnosis start determination part 202 of the controller 200 determines at S108 that a CAN communication state is normal when a CAN communication error signal is not received and finally decides a start of the MHSG failure diagnosis.

Next, the failure judgment part 203 of the controller 200 starts to determine whether there is a failure of the MHSG which operates to assist engine torque for catalyst activation.

The failure judgment part 203 of the controller 200 commands at S109 a required torque of the MHSG for each engine RPM to the MHSG controller 220 and receives at Silo an actual operating torque of the MHSG for each engine RPM from the MHSG controller 220.

An operating torque of the MHSG may be controlled with a command value of a required torque of the MHSG for each engine RPM by a torque control signal from the MHSG controller 220, and the MHSG controller 220 transmits an actual operating torque of the MHSG for each engine RPM to the failure judgment part 203 of the controller 200.

The MHSG controller 220 estimates an actual operating torque of the MHSG by multiplying a gear ratio by the operating power then dividing the calculated value by a number of MHSG revolutions, and transmits the estimated actual operating torque of the MHSG to the failure judgment part 203 of the controller 200.

Then, the failure judgment part 203 of the controller 200 determines that the MHSG is out of order when an actual operating torque of the MHSG transmitted from the MHSG controller 220 deviates from preset limits of a maximum required torque and a minimum required torque of the MHSG for each engine RPM.

For example, the failure judgment part 203 of the controller 200 compares at S111 a value, calculated by subtracting a maximum required torque for each engine RPM from the actual operating torque of the MHSG transmitted from the MHSG controller 220, with the first threshold which is a positive number, then when the value exceeds the first threshold and it is confirmed at S113 that the exceeding time is maintained for a predetermined period of time (e.g., about a second) or more, the failure judgment part 203 of the controller 200 determines at S114 that the MHSG is out of order. On the other hand, if it is not confirmed at S113 that the exceeding time is maintained for the predetermined period of time or more, it is determined at S115 that the MHSG is in a normal state.

Similarly, the failure judgment part 203 of the controller 200 compares at S112 a value, calculated by subtracting an actual operating torque of the MHSG transmitted from the MHSG controller 220 from a minimum required torque of the MHSG for each engine RPM, with the second threshold which is a positive number, then when the value exceeds the second threshold and it is confirmed at S113 that the exceeding time is maintained for a predetermined period of time (e.g., about one second) or more, the failure judgment part 203 of the controller 200 determines at S114 that the MHSG is out of order which means there is something wrong with the performance of the MHSG. On the other hand, when the value does not exceed the second threshold at S112, it is determined at S115 that the MHSG is in a normal state.

As such, when an actual operating torque of the MHSG which operates to assist engine torque for catalyst activation is high enough to exceed the first threshold when compared to a maximum required torque for each engine RPM, or when an actual operating torque of the MHSG is low enough to exceed the second threshold compared to a minimum required torque for each engine RPM, it may be determined that there is something wrong with an actual operating torque of the MHSG, namely an actual output torque, and it may be determined that the MHSG is out of order.

In addition, the MHSG failure code that is output from the failure judgment part 203 of the controller 200 is stored at S116 in a failure code memory 300 for later confirmation in case maintenance is needed due to the MHSG failure.

Further, the MHSG failure code, which is output from the failure judgment part 203 of the controller 200, lets a driver recognize the MHSG is out of order by operating at S117 a failure notification part 310 including car dashboard warning lights.

To sum up, the MHSG failure diagnosis may be made without adding an extra sensor when the output torque of the MHSG is controlled to assist engine torque for catalyst heating to shorten the time for catalyst activation of an exhaust gas purifier immediately after an engine of a mild hybrid vehicle starts, thereby satisfying regulatory requirements of the North-America On Board Diagnosis (OBD) regarding the MHSG component.

Although embodiments of the present disclosure have been described in detail, the scope of rights of the disclosure is not limited to the above embodiments. Thus, various modifications and variations can be made by those skilled in the art using basic concepts of the disclosure defined by the following appended claims, and those modifications and variations should also be considered within the scope of rights of the disclosure.

What is claimed is:

1. A system for mild hybrid starter and generator (MHSG) failure diagnosis of a mild hybrid vehicle, the system comprising:
 a data detection part configured to detect data for determining whether to activate a catalyst; and
 a controller configured to determine whether there is an MHSG failure using a deviation between a required torque and an actual operating torque of an MHSG for each engine RPM after determining whether catalyst activation is needed and whether to start a stage of the MHSG failure diagnosis based on the data detected by the data detection part.

2. The system of claim 1, wherein the data detection part comprises:
 a crank position sensor configured to detect each engine RPM; and
 a water temperature sensor configured to detect an engine coolant temperature.

3. The system of claim 1, wherein the controller comprises:
 a catalyst activation determination part configured to determine whether the catalyst activation is needed based on the data detected by the data detection part;
 a failure diagnosis start determination part configured to determine whether to start the stage of the MHSG failure diagnosis in response to a determination that the catalyst activation is needed; and a failure judgment part configured to determine whether there is the MHSG failure using the deviation between the required torque and the actual operating torque of the MHSG.

4. The system of claim 3, wherein the catalyst activation determination part of the controller is configured to determine that the catalyst activation is needed based on a confirmation that each engine RPM is equal to or higher than an idle RPM upon reading a signal from a crank position sensor and based on a measured water temperature being between an upper limit and a lower limit for determining whether to activate the catalyst upon reading a signal from a water temperature sensor.

5. The system of claim 3, wherein the failure diagnosis start determination part of the controller is configured to:
   determine whether the required torque of the MHSG is equal to or higher than a minimum torque for MHSG failure diagnosis after the catalyst activation determination part determines that the catalyst activation is needed; and
   determine a start of the MHSG failure diagnosis in response to the required torque of the MHSG being equal to or higher than the minimum torque for the MHSG failure diagnosis.

6. The system of claim 3, wherein the failure diagnosis start determination part of the controller is configured to determine a start of the MHSG failure diagnosis only when a controller area network (CAN) communication state between an engine control unit and an MHSG control unit is in a normal state.

7. The system of claim 3, wherein the failure judgment part of the controller is configured to determine that the MHSG is out of order in response to the actual operating torque of the MHSG deviating from preset limits of a maximum required torque and a minimum required torque of the MHSG for each engine RPM.

8. The system of claim 7, wherein the failure judgment part of the controller is configured to determine the MHSG is out of order in response to a value calculated by subtracting the maximum required torque for each engine RPM from the actual operating torque of the MHSG exceeding a first threshold for a predetermined period of time or more.

9. The system of claim 7, wherein the failure judgment part of the controller is configured to determine that the MHSG is out of order in response to a value calculated by subtracting the actual operating torque of the MHSG from the minimum required torque for each engine RPM exceeding a second threshold for a predetermined period of time or more.

10. The system of claim 7, further comprising:
   a failure code memory configured to store an MHSG failure code output from the failure judgment part of the controller; and
   a failure notification part configured to notify the MHSG failure.

11. A method for a mild hybrid starter and generator (MHSG) failure diagnosis of a mild hybrid vehicle, the method comprising:
   determining whether a catalyst activation of an exhaust gas purifier is needed after an engine start of the mild hybrid vehicle;
   determining whether to start the MHSG failure diagnosis when an MHSG is operated to assist engine torque for the catalyst activation; and
   determining whether there is an MHSG failure using a deviation between a required torque and an actual operating torque of the MHSG for each engine RPM.

12. The method of claim 11, further comprising determining the catalyst activation is needed based on each engine RPM being equal to or higher than an idle RPM and a measured water temperature being between an upper limit and a lower limit for determining the catalyst activation.

13. The method of claim 11, further comprising determining the start of the MHSG failure diagnosis in response to the required torque of the MHSG for the catalyst activation being equal to or higher than a minimum torque for the MHSG failure diagnosis.

14. The method of claim 11, further comprising determining that the MHSG is out of order based on the actual operating torque of the MHSG that is obtained from multiplying a gear ratio by an operating power and then dividing the multiplying result by an engine RPM of the MHSG deviating from preset limits of a maximum required torque and a minimum required torque of the MHSG for each engine RPM.

15. The method of claim 14, further comprising determining that the MHSG is out of order based on a value calculated by subtracting the maximum required torque of the MHSG for each engine RPM from the actual operating torque of the MHSG exceeding a first threshold and an exceeding time being maintained for a predetermined period of time or more.

16. The method of claim 14, further comprising determining that the MHSG is out of order based on a value calculated by subtracting the actual operating torque of the MHSG from the minimum required torque of the MHSG for each engine RPM exceeding a second threshold and an exceeding time being maintained for a predetermined period of time or more.

17. The method of claim 14, further comprising storing an MHSG failure code in a failure code memory after the MHSG failure is determined and operating a failure notification part by the MHSG failure code after the MHSG failure is determined.

18. A method for a mild hybrid starter and generator (MHSG) failure diagnosis of a mild hybrid vehicle, the method comprising:
   determining a catalyst activation of an exhaust gas purifier is needed after an engine start of the mild hybrid vehicle based on an engine RPM being equal to or higher than an idle RPM and a measured water temperature being between an upper limit and a lower limit for determining the catalyst activation;
   determining to start the MHSG failure diagnosis in response to an MHSG being operated to assist engine torque for the catalyst activation and a required torque of the MHSG for the catalyst activation being equal to or higher than a minimum torque for the MHSG failure diagnosis; and
   determining whether there is an MHSG failure using a deviation between the required torque and an actual operating torque of the MHSG for each engine RPM.

19. The method of claim 18, further comprising determining there is the MHSG failure based on the actual operating torque of the MHSG that is obtained from multiplying a gear ratio by an operating power and then dividing the multiplying result by the engine RPM of the MHSG deviating from preset limits of a maximum required torque and a minimum required torque of the MHSG for each engine RPM.

20. A system for mild hybrid starter and generator (MHSG) failure diagnosis of a mild hybrid vehicle, the system comprising:

a data detection part configured to detect data for determining whether to activate a catalyst; and a controller configured to determine whether there is an MHSG failure using a deviation between a required torque and an actual operating torque of an MHSG for each engine RPM after determining whether catalyst activation is needed and whether to start a stage of the MHSG failure diagnosis based on the data detected by the data detection part, wherein, when determining whether catalyst activation is needed, the controller is configured to determine that the catalyst activation is needed based on a confirmation that an engine RPM is equal to or higher than an idle RPM upon reading a signal from a crank position sensor and based on a measured water temperature being between a predetermined upper limit and a predetermined lower limit for determining whether to activate the catalyst upon reading a signal from a water temperature sensor; and wherein the mild hybrid starter and generator (MHSG) failure diagnosis is enabled when the mild hybrid starter and generator (MHSG) operates while assisting an engine torque for catalyst heating to shorten the time for catalyst activation of an exhaust gas purifier immediately after an engine start.

\* \* \* \* \*